No. 764,002. PATENTED JULY 5, 1904.
C. C. PECK.
PROCESS OF MEASURING HEAT IN HOT WATER HEATING SYSTEMS.
APPLICATION FILED AUG. 20, 1902.
NO MODEL. 4 SHEETS—SHEET 1.
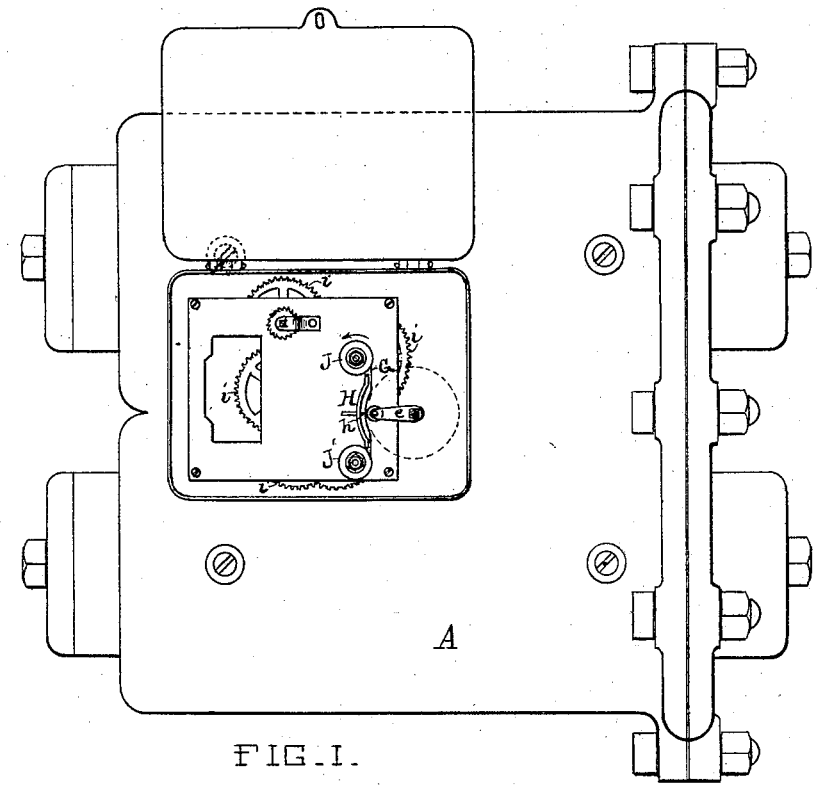
FIG. I.
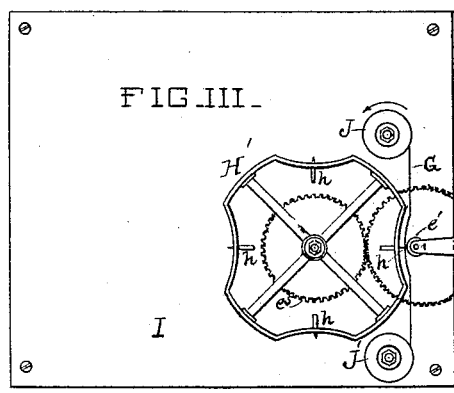
FIG. III.
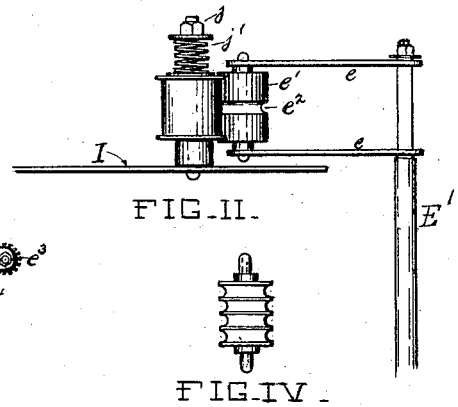
FIG. II.
FIG. IV.
WITNESSES:
Wm. W. Hill
L. D. Peck
INVENTOR:
Cassius Carroll Peck No. 764,002. PATENTED JULY 5, 1904.
C. C. PECK.
PROCESS OF MEASURING HEAT IN HOT WATER HEATING SYSTEMS.
APPLICATION FILED AUG. 20, 1902.
NO MODEL. 4 SHEETS—SHEET 2.
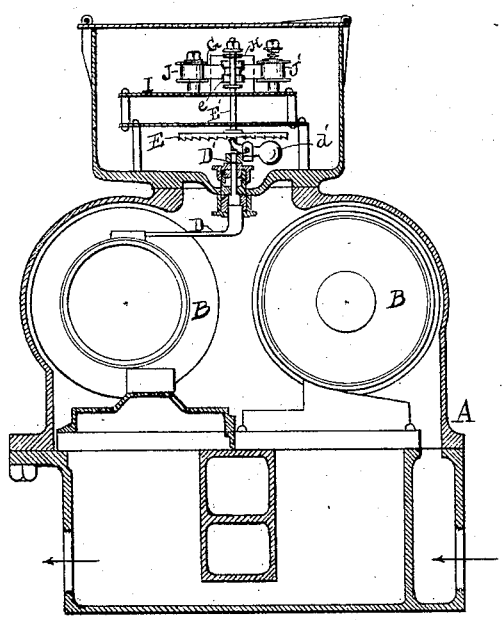
FIG. V.
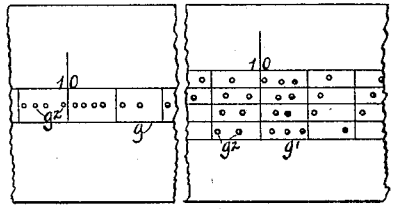
FIG. VI.   FIG. VII.
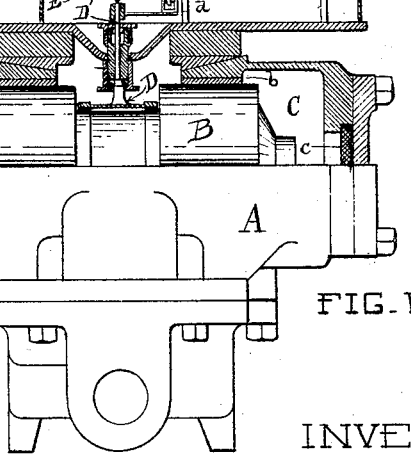
FIG. VIII.
WITNESSES:
Wm. W. Hill
L. D. Peck
INVENTOR:
Cassius Carroll Peck.

No. 764,002. PATENTED JULY 5, 1904.
C. C. PECK.
PROCESS OF MEASURING HEAT IN HOT WATER HEATING SYSTEMS.
APPLICATION FILED AUG. 20, 1902.
NO MODEL. 4 SHEETS—SHEET 3.
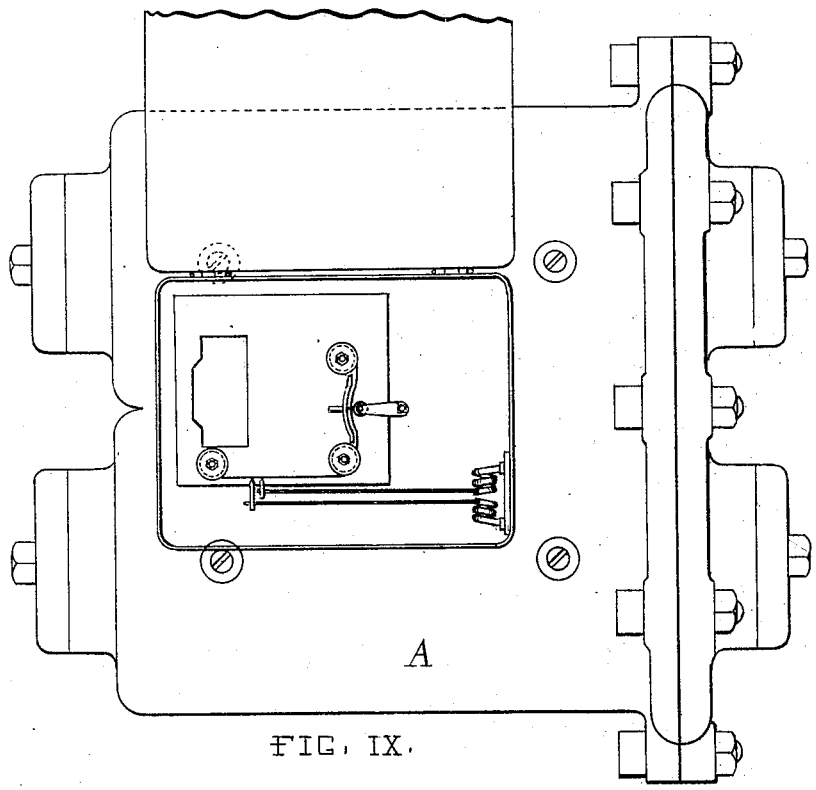
FIG. IX.
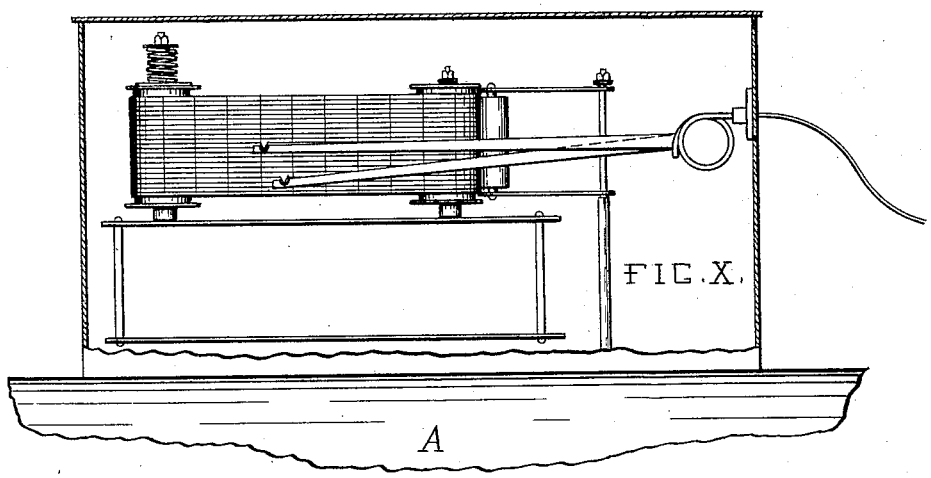
FIG. X.
WITNESSES:
L. D. Peek
Jno. N. McInerney
INVENTOR:
Cassius Carroll Peck

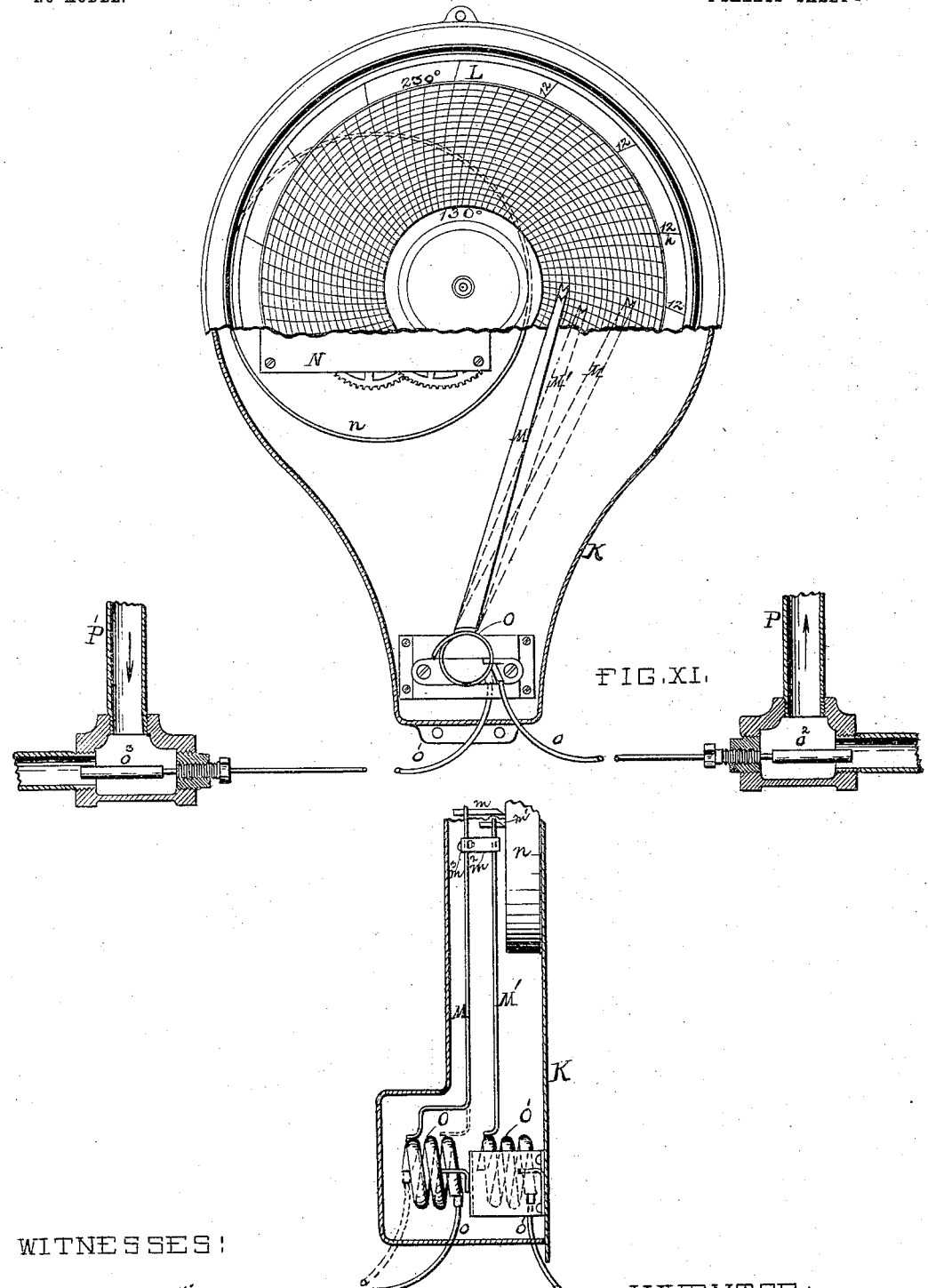

No. 764,002.

Patented July 5, 1904.

UNITED STATES PATENT OFFICE.

CASSIUS CARROLL PECK, OF ROCHESTER, NEW YORK.

PROCESS OF MEASURING HEAT IN HOT-WATER HEATING SYSTEMS.

SPECIFICATION forming part of Letters Patent No. 764,002, dated July 5, 1904.

Application filed August 20, 1902. Serial No. 120,342. (No specimens.)

*To all whom it may concern:*

Be it known that I, CASSIUS CARROLL PECK, residing at Rochester, in the county of Monroe and State of New York, have invented a certain new and useful Process of Measuring Heat in Hot-Water Heating Systems, of which the following is a specification sufficient to enable others skilled in the art to which the invention appertains to make and use the same.

My invention relates to heating air and liquids by a circulation of heated water, said water acting as the heat vehicle for conveying heat from its source to the point of delivery. It is more especially intended for a central-station system of heating, in which a considerable number of buildings are to be supplied with heat for warming air in the buildings, for heating water for domestic and other uses, and for any purpose connected with manufacturing to which a mechanically-forced circulation of hot water is adapted. While it can be applied to a natural or gravity circulation of heated water the same as to a forced circulation, the requirement for employment in such connection is less in extent with the former as compared with the latter. Natural or gravity circulation can be depended upon only for heating a single building or a small group of buildings which are generally under one ownership. In the central-station system there are numerous users which require greatly-varying amounts of heat, and it becomes highly important that each user shall be charged with the heat which he appropriates, no more, no less, the same as in the distribution of illuminating and heating gas. Otherwise the business of supplying heat is on a guesswork basis, as it is impracticable to accurately apportion to each of numerous users his share of the total heat supplied by a water-circulating system, and the result is that any one user is charged with more or less than he has received, and there is no special inducement for individuals to exercise care and economy in consumption, and all pay at a higher rate than is necessary under a heat-measuring system or else the central station fails to receive a fair return for what it supplies. The difficulties involved have heretofore prevented measurement of heat supplied by a circulation of heated water, and this has delayed the introduction of the economical and every way desirable method of heating by a forced circulation. My process of determining with close approximation to correctness the amount of heat supplied by such a circulation greatly encourages its use, for measurement induces economy on the part of users of the heat where waste would otherwise be allowed, and this makes it possible to furnish at minimum cost the amount of heat which each actually requires. Measurement also induces use of such a heating system through the knowledge that only heat used will have to be paid for. The central station can also make prices which will be fair and tempting to users and at the same time such as will be just to itself, because the element of doubt is eliminated. Knowing what heat at the station costs and the percentage of loss from distributing-mains, the rates to customers can be made with as full a knowledge of cost as in the case of gas in the manufacture and sale of this commodity.

In my concurrent application for Letters Patent for improvements in apparatus for measuring heat in a hot-water heating system I have described, shown, and claimed the special mechanism required for supplying the data needed in determining how much heat has passed out of a circulation of hot water. In the just-named application a hot-water meter of same general design as now manufactured is fitted with a time-chart moved by clockwork, on which chart the registering devices of the meter imprint the meter measurements, so that the volume of water circulation for each hour shall be continuously recorded. In the above-named application two thermometers—one connected with the inflowing current and the other connected with the outflowing current of the hot-water circulation—are arranged for continuously recording on one time-chart, moved by clockwork, the temperature of each current or else directly recording by a single line the difference in temperature of the two currents, which is the drop in temperature caused by escape of heat during the course of circulation. These two sets of devices cover the mechanical appliances required for obtaining data for calculating the amount of heat which has passed out of a water-circulating system. Having obtained from the time-recording meter the hourly circulation, the volume of this circulation, usually recorded in cubic feet, is multiplied by the weight per cubic foot at the temperature as shown by the recording-thermometer connected with the inflowing current to obtain the weight of water which has passed through the meter during each hour or other short-time period for which the meter time-chart is adapted. The next step is to get from the thermometer-chart the average difference in temperature between the inflowing current of heated water and the outflowing current of cooled water during each hour or other time period. This difference or drop in temperature is then used as a multiplier, and the hourly weight of water, as above referred to, is used as a multiplicand, the result being the number of British thermal units which have escaped from the water during the hour or other time period.

In the accompanying drawings I show mechanical devices suited for carrying out my process of heat measurement, these being the same as those shown in the concurrent application for Letters Patent, as hereinbefore referred to.

In the drawings like parts in all the figures are indicated by the same letters.

In drawings of the time-recording meter, Figure 1 is an elevation of the top of the case of a water-meter, also showing inclosed in a supplemental case a top or plan view of mechanism connected with my invention. Fig. 2 is a side elevation, on a larger scale, of the primary registering-shaft of the meter and of my recording devices. Fig. 3 is a plan or top view of a modification of my recording mechanism. Fig. 4 is an elevation of the impression-roller required for the design shown in Fig. 3. Fig. 5 is a central cross-section of the meter-case and a sectional elevation of the recording mechanism. Fig. 6 is an elevation of a portion of the recording-ribbon used with the recording devices shown in Figs. 1, 2, 5, and 6. Fig. 7 is an elevation of a portion of the recording-ribbon used with the modification of recording mechanism shown in Figs. 3 and 4. Fig. 8 shows the lower half of the meter-case in side elevation, the upper half or portion above the horizontal center of the plungers being a central section of the case with one of the plungers and also the recording devices in elevation. Fig. 9 shows the same view of the meter-case as Fig. 1, the supplemental case being shown as containing a top view of my complete mechanism for registering the hourly flow of hot water and for recording on the same chart the temperature of both the outflowing current and of the inflowing current. Fig. 10 is a side elevation of my recording devices shown in Fig. 9, the case being broken away to expose same. Fig. 11 is an elevation of a convenient form of double-record thermometer for use independent of a meter, the lower portion of the case being broken away to show the internal mechanism. Fig. 12 is a sectional elevation of the instrument-case with the recording devices shown in Fig. 11, the view being at right angles to Fig. 11.

In the several figures, A is the case of a Worthington water-meter.

B B, Figs. 5 and 8, are the plungers, which are fitted in parallel rings $b\, b$, Fig. 8. Water under pressure is admitted through the proper inlet-ports into chamber C at one end of each plunger alternately, while the connection is made between the chamber at the other end of the outlet. Thus the plunger in moving displaces its volume, discharging it through its outlet. The stroke of the two plungers alternates, the valve actuated by one admitting pressure to the other. The plungers are brought to rest at the end of the stroke by buffers $c\, c$. One plunger imparts a reciprocating motion to the lever D, which actuates the recording mechanism through shaft $D'$ and ratchet-wheel E on shaft $E'$. The reciprocating movement of plunger B moves the lever D first one way and then the other, each movement being equal to the stroke of the plunger, and the lever, being attached to shaft $D'$, turns the shaft a certain amount for each stroke of the plunger. The upper end of shaft $D'$ carries an arm $d$, Fig. 8, having at its outer end a pawl $d'$, which engages with ratchet-wheel E on shaft $E'$. At the upper end of the latter are two arms $e\, e$, secured to the shaft and carrying at their outer ends a vertically-set roller $e'$, having one or more circumferential grooves $e^2$. The office of this roller is to press the paper ribbon G into contact with the metallic point $h$, fixed in the plate H, Fig. 1, the groove in roller $e'$ corresponding with said point, so that the ribbon shall be punctured by the point as the roller passes it without bringing the point in contact with the roller. Clockwork $i$, contained in frame I, drives roller J, to which ribbon G is attached, and gradually unrolls it from roller $J'$. The ribbon is kept sufficiently taut by screwing down more or less the nut $j$ on spring $j'$, Fig. 2. The clockwork is usually made for running eight days without rewinding. On the face of ribbon G is printed a chart, as $g\, g'$, Figs. 6 and 7, for indicating hours or other short and uniform periods of time, the vertical lines in said figures representing the equal periods. Perforations $g^2$, made by point $h$, show the number of revolutions of shaft $E'$ within each of the time periods of the chart and within any number of such periods, as each revolution of said shaft causes point $h$ to puncture ribbon G through being pressed against the point by roller $e'$, said point entering the groove in said roller.

In Fig. 3, H' is a modification of plate H (shown in Fig. 1) in that it has four faces, each having a metallic point $h$, these points being set one above the other, as indicated by the position of holes $g^2$, made in ribbon G by the four points, as shown in Fig. 7. The object is to provide more room between hour-marks on the ribbon for perforations. Plate H' is rotated by pinion $e^3$ on shaft E', the pinion engaging with idler-wheel $e^4$, and this in turn with spur-wheel $e^5$ on shaft $h'$, to which is attached plate H', the driving-gear being so proportioned that one revolution of shaft E' will give shaft $h'$ a quarter-turn. Instead of plate H' a plate with more or less faces can be employed, the driving-gear being proportioned so as to bring each face in line with shaft E' at the moment roller $e'$ passes the point $h$. The clockwork is generally designed for running eight days without rewinding. At the time of winding the clock a fresh ribbon can be conveniently substituted for the one which has been used. Ribbon G can, however, be made of sufficient length to last during two or more winding periods. From the used ribbon a book-record of hourly (or other short time) circulation can be made, and the ribbon may then be filed as a permanent record, each ribbon being preferably dated both when placed in the meter and when taken out.

In my concurrent application for Letters Patent on the hereinbefore-described time-recording meter certain modifications of the parts are described, especially as suiting the meter for measuring differing amounts of circulation; but as the present object is only to make clear in a general way the manner of carrying out my process of heat measurement it is not deemed necessary to give fuller details relating to the meter construction.

In the accompanying drawings of my recording-thermometer, Fig. 11 is an elevation of the case, chart, and recording devices, the lower portion of the case and of the chart being broken away to show the operating parts. Fig. 12 is a sectional elevation of the lower portion of the instrument-case and is at right angles to Fig. 1. In Fig. 11, K is the case of the recording instrument, and L the chart on which marker-arms M M' draw the record-lines, said lines being made either with crayon-points or by inking-points $m\, m'$, one arm being extended beyond the other to prevent interference of the two inking-points. Chart L is revolved at a uniform rate by clockwork N in case $n$. For a hot-water heating system the chart is divided into radial markings representing hours and into circular markings representing temperatures. The subdivisions on the chart are usually for one hundred and ninety-two hours and the temperature range of 100° Fahrenheit—say from 130° to 230°—the clockwork being made for running eight days without rewinding. With these conditions it will be necessary to supply a new chart and wind the clock once a week. Marker-arms M M' are attached to the free end of helically-formed flattened metallic tubes O O', the opposite ends of the tubes being anchored to the case K and attached to quite small metallic tubes $o\, o'$, which are attached at the opposite ends to thermometer-bulbs $o^2\, o^3$, respectively, inserted in pipes P P'. The connecting-pipes $o\, o'$ are preferably made of copper or brass. The distance from pipes P P' to coils O O' is optional and may be as much as twenty to twenty-five feet. Coils O O', pipes $o\, o'$, and thermometer-bulbs $o^2\, o^3$ are all filled, preferably, with alcohol, the expansion of which by heat applied to said thermometer-bulbs creates pressure which tends to straighten out the coils, and thus move the marker-arms M M' laterally across the face of chart L in proportion to the degree of pressure. Thus in Fig. 1 the marker-arm M, which indicates the higher of two temperatures, is shown in solid lines at about the starting-point—say at 130° to 140° Fahrenheit—and in broken lines at a point which may indicate about 200°, which latter might be the temperature of water entering the building being heated. The shorter marker-arm M', as shown in broken lines, may represent the temperature of water on leaving the building after circulating through radiators, say, 40° below the initial temperature, although this would represent greater than average difference in a good heating system. On a good-sized chart the difference, whatever it was, would be seen by a glance at the lines made by the two markers, and the record of difference in temperature would be conveniently taken down on a blank usually made for hourly entries. This facility in drawing off the hourly record is of much importance in a central-station system of heating. In case of a large number of users of heat from such a station the labor involved in deducing the difference in temperature from two separate charts each taken from a separate recording-thermometer would be great and of a wearisome and taxing nature. With a single chart inscribed with the two temperature-lines the eye and brain only have to measure the distance between the two temperature-lines, and this an experienced person can do almost instantly and without noticeable effort of thought. The inflow-pipe P and the outflow-pipe P' require to be located at not over about fifty feet distance from each other where the former enters and the latter leaves the building or heating system supplied. This will insure accuracy in the record of each thermometer. Coils O O' can be variously placed with respect to each other, as shown and described in my concurrent application for Letters Patent on the hereinbefore-described recording-thermometer.

In Fig. 2 marker-arms M M' are shown as bound together at the pointer ends by a sleeve $m^2$, held in position by a bolt $m^3$. This arrangement requires a differently-lined chart and is for the purpose of reading the difference between two temperatures by a single line drawn by point $m$ on the chart. The radial or time lines on the chart would remain as heretofore described; but the circular lines would be made to indicate difference in temperatures and not the temperatures themselves. If the range of temperature to be measured were 100° and there were twenty circular lines on the chart, then the space between each two circular lines would represent 5°, or if there were fifty circular lines then the space between would represent 2°. Coils O O' are also reversed in position in case K, so that marker-arms M M' shall be actuated in opposite directions, and thus oppose each other, under which condition only the excess of pressure on one arm as compared with the other arm will cause a lateral movement of point $m$, and the extent of this lateral movement will be the measure of difference of temperature at the points where the two thermometer-bulbs $o^2$ $o^3$ are located. The reverse position of one of the two coils—that is, of O'—and of marker-arm M is indicated by broken lines in Fig. 12.

Figs. 9 and 10 show the mechanism of the two steps which have heretofore been described in detail as embodied in one apparatus. This does not require any change in the manner of recording meter measurements as already described or in clockwork for driving ribbon G, but does require an additional roller—namely, $J^2$, on which spring $j'$ is placed rather than on roller J', the latter becoming an idler guide-roller. Coils O O' are properly placed for actuating marker-arms M M', so they will record on ribbon G. The horizontal lines on said ribbon are made to represent temperatures if marker-arms M M' record independently of each other, as shown in Fig. 10, or if the two arms are united at the marking ends, as hereinbefore described, then the horizontal lines are made to represent difference in temperature between the inflowing current of the heating system and the outflowing current. The vertical lines on the ribbon represent hours or other short time periods and are the same as if the ribbon were used for recording meter measurements only. The advantage of assembling all the devices required for obtaining data for calculating the amount of heat delivered from a hot-water heating system in one compound instrument is that first cost is a minimum, installation is easiest, space required for setting and using is a minimum, and convenience in taking off the record is greatest where both temperature and quantity of circulation are recorded on the same chart.

While the clockwork for both water-meter and thermometers is usually made for running eight days, it can be made for running a longer time without rewinding.

In taking off in a record-book the chart-record of volume of water circulation through the heating system for each hour or other short time period and the average difference in temperature between the inflowing current and the outflowing current for each of the time periods it is desirable that there should be one column for volume of water circulation, another column giving the temperature of water passing through the meter, and a third column giving the weight of water circulated in each time period. A fourth column should give the average difference in temperature between the inflowing current and the outflowing current of the heating system for each of the chart time periods. A fifth column should give in heat units (British thermal units) the result of multiplying the figures in column 4 into the figures in column 3. A sixth column should give the number of heat units supplied for each twenty-four hours, a seventh column the total number of heat units supplied for a chart period—say one week—and in an eighth column should be entered the total number of heat units supplied for a month or, say, for four chart periods. If bills are rendered to customers monthly, then the monthly total of heat supplied to each user can be posted from the said general record-book onto individual ledger-accounts. In posting from the charts onto the record-book it is not generally necessary to make an extension for each hour of a day, as a considerable part of the time the record usually runs nearly uniform, especially during the night, and for such uniform periods it is only requisite that the total be entered.

This process of measuring heat-delivery puts the business of supplying heat through the medium of a forced circulation of heated water on an equally exact basis as that of supplying electric current and gas.

The data necessary to obtain for determining the heat supplied from the fluid or water circulating through the radiating devices are the volume of flow and the average difference in temperature of the fluid or water flowing into the circuit or radiating devices as compared with the fluid or water flowing out of said circuit for the same period of time as that for which the volume of flow has been determined, and the example set forth herein is by registering and comparing the expansions of the substance in the thermometers at the inlet and outlet of the heating-circuit.

Having described my invention, what I claim, and desire to secure by Letters Patent, is—

1. The process of determining the amount of heat supplied from a fluid circulated through radiating devices for a definite period of time consisting of continuously measuring and continuously registering the volume of flow of said fluid for said period; and determining the average difference in temperature of the fluid flowing into the heating-circuit as compared with the fluid flowing out of said heating-circuit for said period; and finally multiplying the said average difference in temperature by the weight of fluid which has flowed through the heating-circuit in said period of time, substantially as set forth.

2. The process of determining the amount of heat supplied from a fluid circulated through radiating devices for a definite period of time consisting of continuously measuring and continuously registering the volume of flow of said fluid for said period; and determining the average difference in temperature of the fluid flowing into the heating-circuit as compared with the fluid flowing out of said heating-circuit for said period by comparing the expansion of a substance in contact with said fluid at the inlet to said circuit with the expansion of a substance at the outlet thereof and continuously registering said expansions; and finally multiplying the said average difference in temperature by the weight of fluid which has flowed through the heating-circuit in said period of time, substantially as set forth.

3. The process of determining the amount of heat supplied from a fluid circulated through radiating devices consisting of measuring the volume of the fluid flowing through the latter and automatically registering said volume, whereby the quantity circulated for a determined period of time is given, and automatically and continuously registering the different temperatures of the inflowing and of the outflowing currents of fluid in the heating system, and finally multiplying the weight of fluid circulated in said period of time by the average difference in the temperatures between the inflowing and outflowing currents for said period.

4. The process of determining the amount of heat supplied from a fluid circulated through radiating devices, consisting of measuring the volume of the liquid flowing through the latter, and automatically recording said volume on a chart mechanically moved at uniform speed whereby the quantity circulated for each hour, or other similarly short period of time, may be obtained, together with automatically and continuously recording the different temperatures of the inflowing and of the outflowing current of fluid in the heating system, and, finally, multiplying the weight of fluid circulated within a given time period by the average difference in the temperatures between the inflowing and outflowing currents for the same period.

CASSIUS CARROLL PECK.

Witnesses:
    WM. W. HILL,
    L. D. PECK.